Figure 1:
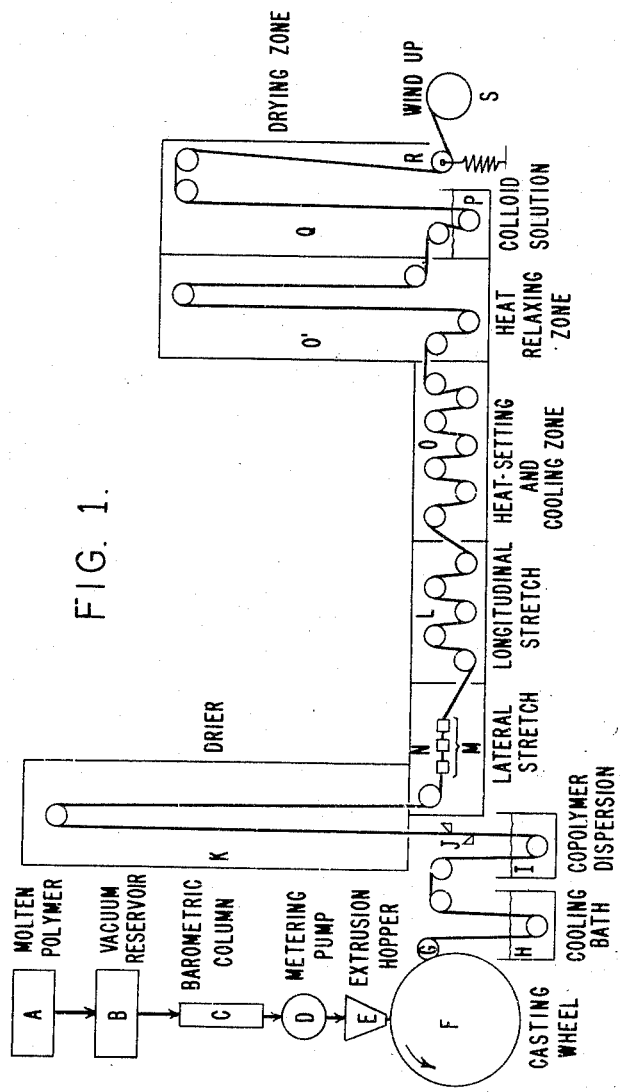

Jan. 29, 1957   F. P. ALLES   2,779,684
POLYESTER FILMS AND THEIR PREPARATION
Filed Feb. 17, 1955   2 Sheets-Sheet 1

INVENTOR
FRANCIS PETER ALLES

BY *Lynn Barrett Morris*

ATTORNEY

Jan. 29, 1957 F. P. ALLES 2,779,684
POLYESTER FILMS AND THEIR PREPARATION
Filed Feb. 17, 1955 2 Sheets-Sheet 2

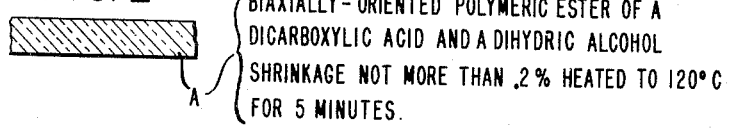

FIG. 2 {BIAXIALLY-ORIENTED POLYMERIC ESTER OF A DICARBOXYLIC ACID AND A DIHYDRIC ALCOHOL SHRINKAGE NOT MORE THAN .2% HEATED TO 120°C FOR 5 MINUTES.

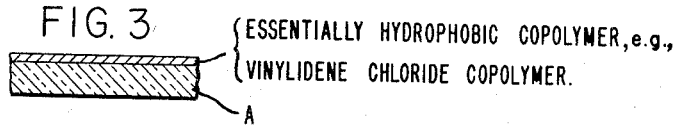

FIG. 3 {ESSENTIALLY HYDROPHOBIC COPOLYMER, e.g., VINYLIDENE CHLORIDE COPOLYMER.

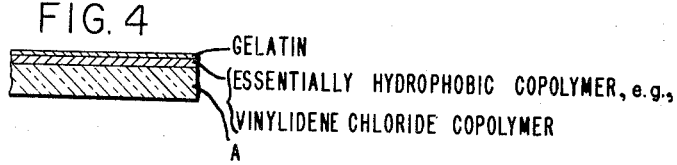

FIG. 4 — GELATIN
{ESSENTIALLY HYDROPHOBIC COPOLYMER, e.g., VINYLIDENE CHLORIDE COPOLYMER

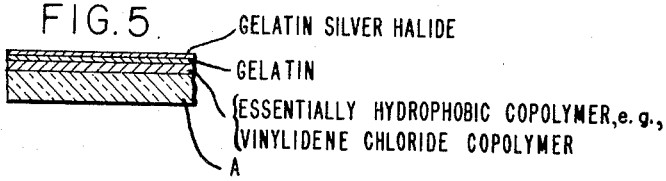

FIG. 5 — GELATIN SILVER HALIDE
— GELATIN
{ESSENTIALLY HYDROPHOBIC COPOLYMER, e.g., VINYLIDENE CHLORIDE COPOLYMER

INVENTOR
FRANCIS PETER ALLES

BY Lynn Barrett Morris
ATTORNEY

United States Patent Office 2,779,684
Patented Jan. 29, 1957

2,779,684

POLYESTER FILMS AND THEIR PREPARATION

Francis Peter Alles, Westfield, N. J., assignor to E. I. du Pont de Nemours and Company, Wilmington, Del., a corporation of Delaware Application February 17, 1955, Serial No. 488,999

20 Claims. (Cl. 117—7)

This invention relates to a process for the preparation of an unsupported oriented polyester film of improved dimensional stability. More particularly it relates to such a film having an adherent substratum of a polymeric film-forming material and a water-permeable colloid layer. More particularly it relates to such a process wherein the film has on its surface a thin coating composed of a poly(vinylidene chloride co itaconic acid co vinyl ester) which in turn bears a water-permeable colloid layer. The invention also relates to the light-insensitive products obtainable by such processes and to a photographic film having at least one water-permeable colloid silver halide emulsion layer disposed on such copolymer coated polyester film either directly or by means of a water-permeable colloid anchor layer.

In Alles and Saner U. S. Patent 2,627,088, there is disclosed a process of preparing photographic film including casting or extruding into the form of an unsupported sheet of film, a molten highly polymeric ester of a dicarboxylic acid and a dihydric alcohol, said ester being capable of being formed into filaments which when cold drawn show by characteristic X-ray patterns molecular orientation along the fiber axis, coating at least one surface of the polyester film with an aqueous dispersion of a copolymer containing at least 35% by weight of vinylidene chloride, drying the coated vinyl ester film and biaxially orienting the coated film by stretching it at an elevated temperature. A water-permeable colloid layer is then applied to the layer of copolymer to serve as an anchor layer for a colloid silver halide emulsion layer.

Photographic film produced in accordance with the process of U. S. P. 2,627,088 has many useful properties. Its mechanical strength and flexibility are excellent. It has excellent dimensional stability when exposed to temperatures below 90° C. Water-permeable colloid silver halide emulsion layers have strong adherence to the copolymer-coated base film. Such photographic film is useful as X-ray film, portrait film, motion picture film and for photographic purposes in general.

Motion picture exhibitors are now using projectors which operate at higher temperatures than formerly, because of the use of larger viewing screens and 3-dimensional pictures. The perforated photographic film used in such projectors often is raised to temperatures of 120° C. or higher, which causes a slight change (shrinkage) in the pitch from one perforation to the next which, in turn, causes unsteadiness, chatter, vibrations and wobble. The distance between perforations decreases so that the teeth on the projection apparatus do not so uniformly and accurately engage the perforations. Also, the shrinkage may result in buckling of the film which causes image distortion on the screen.

An object of this invention is to provide a polyester film with improved dimensional stability. Another object is to provide such film which does not show any significant shrinkage when exposed to a temperature of 120° C. for five minutes under conditions of no tension. A further object is to provide dimensionally stable photographic film having a polyester film base. A still further object is to provide a simple yet practical process of making such film. Still other objects will be apparent from the following description of the invention.

It has been found that the dimensional stability of film composed of a highly polymeric ester of a dicarboxylic acid and a dihydric alcohol capable of being formed into filaments which when cold drawn show by characteristic X-ray patterns orientation along the fiber axis, and particularly of a polyethylene terephthalate, which film has been biaxially oriented and heat-set, e. g., at a temperature from 150° C. to 210° C. under tension such that dimensions will be held constant, can be improved by heating it to a temperature of 110° C. to 150° C. for a period of 60 to 300 seconds while under a slight tension between 10 and 300 and preferably between 10 and 25 pounds per square inch. When the film is to be used as a base for photographic purposes, the second heating operation can be carried out either before or after the application of a water-permeable colloid substratum for anchoring a water-permeable colloid silver halide emulsion layer to the copolymer coated polyester film. This second heat treatment, which is carried out at a temperature above the temperatures normally used in drying aqueous water-permeable colloid layers, relaxes the stresses in the biaxially-oriented film and markedly improves its dimensional stability.

The amount of tension to be used for relaxing stresses in a particular polyester film will depend primarily upon the temperature to which it will be subjected in use. In general the tension will be increased, between the limits given above, in proportion to the increase in the temperature. For example, in order to produce a polyester film which does not shrink more than 0.2% in dimensions when heated to 120° C. for five minutes, a tension of 175 pounds per square inch can be used at a temperature of 120° C. for a period of 5 minutes, whereas a tension of 295 pounds per square inch can be used at 139° C. for a period of 5 minutes.

In an exemplary procedure for carrying out the invention, a molten polyester, e. g., a polyethylene terephthalate, is cast or extruded onto a suitable smooth surface and stretched longitudinally or laterally, in either order or simultaneously, at a temperature of 70° C. to 120° C., heat-set at a temperature between 150° C. and 210° C. at a tension such that dimensions will be held constant, and then passed into a heating zone where it is heated to a temperature between 110° C. and 150° C. for a period of 1 to 3 minutes under slight tension whereby internal stresses are relaxed.

In the exemplary procedure just described, if desired, the polyester film can be coated with a thin layer of an adherent film-forming copolymer prior to the biaxial stretching step or steps. Suitable such copolymers include the vinylidene chloride copolymers containing at least 35% by weight of vinylidene chloride, e. g., the poly(vinylidene chloride co acrylic or methacrylic ester or nitrile co itaconic acid) compounds described in Alles and Saner U. S. P. 2,627,088, the polyisocyanates and polyisothiocyanates described in Saner U. S. P. 2,698,242, the mixtures of (a) polyester of ethylene glycol, terephthalic acid and polyethylene glycol or saturated aliphatic dicarboxylic acid, soluble in $CHCl{=}CCl_2$, and (b) organic polyisocyanate or polyisothiocyanate described in Saner U. S. P. 2,698,241 and the polyesters of aforesaid item (a) described in Alles and Saner U. S. P. 2,698,239. Such sublayers will be applied if the heat-set, heat-relaxed film is to be used for the manufacture of photographic film. In such case, it is desirable to apply a thin layer of a water-permeable colloid, e. g., gelatin or a synthetic colloid or mixture of the two, from an aqueous solution or dispersion and drying the layer at a temperature of 100° C. to 105° C. before the heat-relaxing operation. In general the oriented, heat-set, coated or uncoated polyester film will be maintained in the heat-relaxing zone at the prescribed temperature for about 1 to 10 or more minutes.

The casting or extruding of the polyester film coating of the copolymer, heat-setting, colloid-coating and drying steps can be carried out in an apparatus of the type described in Alles et al. U. S. P. 2,627,088, granted February 3, 1953. This apparatus consists of reaction vessel A from which molten polymer is run into vacuum reservoir B from there it is led through a barometric column C to a metering pump D and forced through extrusion hopper E onto the surface of casting wheel F. The solidified film is removed from the wheel over roller G and passes under a roller in cooling bath H then into bath I where it is coated with a vinylidene chloride copolymer dispersion and the coatings, the thickness of which is controlled by doctor knives J, are dried in drier K. The dry coated film is stretched laterally in zone or chamber N on tenter belts or rolls schematically shown at M, then stretched longitudinally in chamber L and heat-set in zone O. The heat-relaxing step following the drying step can be carried out in another chamber O′ similar to the heat-setting and cooling zone O in the apparatus of the aforesaid patent, but is preferably carried out in a chamber where the film is in vertical paths and passes over and under rollers. The heat-relaxing zone can be heated near the entrance by infrared lamps or electrically heated platens and then by means of hot air or superheated steam.

The heat-relaxed, copolymer coated, biaxially-oriented polyester film is then passed into bath P containing an aqueous gelatin solution and the gelatin sublayers are dried in zone Q. The dried film passes under roller R to a windup station S.

The apparatus just described is shown in the attached drawing wherein:

Fig. 1 is a schematic view in elevation of the entire apparatus,

Fig. 2 is a cross-sectional view of a heat-relaxed biaxially-oriented polymeric ester film as described in Example I, Fig. 3 is a cross-sectional view of a heat-relaxed vinylidene chloride copolymer coated, biaxially-oriented polymeric ester film as described in Example II, Fig. 4 is a cross-sectional view of a heat-relaxed vinylidene chloride copolymer coated, gelatin coated, biaxially-oriented polymeric ester film as described in Example IV, Fig. 5 is a cross-sectional view of a heat-relaxed, vinylidene chloride copolymer coated, gelatin coated, biaxially-oriented polymeric ester film bearing a colloid silver halide emulsion layer.

The invention will be further illustrated but is not intended to be limited by the following examples.

*Example I*

A molten ethylene glycol/terephthalate acid polyester having a melting point of about 255° C. is extruded through an elongated orifice having the lips spaced about 90 mils apart onto a casting drum having a peripheral speed of about 90 inches per minute to form a film about 38 mils thick. The film is biaxially stretched, first longitudinally and then laterally, about 3.0 times in unit length and width at a temperature of about 88° C., heat-set at a temperature of 150° C. under tension so that no shrinkage occurs, and then given a second heat treatment at a temperature of 119° C. under a tension of 75 pounds per square inch for a period of 5 minutes. A sample of the resulting film, when heated to a temperature of 120° C. for a period of 5 minutes under no tension, exhibited a shrinkage of only 0.07%, whereas a sample of the film which did not receive the second heat treatment exhibited, under the same conditions, a shrinkage of 1.05%.

*Example II*

The process described in Example I was repeated, except that the film was heat-set at a temperature of 180° C. and the second heat treatment was at a temperature of 132° C., a tension of 12 pounds per square inch and for a period of 2 minutes. A sample of the film, when heated to a temperature of 120° C. for a period of 5 minutes under no tension, exhibited a shrinkage of only 0.06%, whereas a sample of the film which did not receive the second heat treatment exhibited, under the same conditions, a shrinkage of 0.95%.

*Example III*

The process set forth in Example I was repeated, except that the film was heat-set at a temperature of 210° C. and the second heat treatment was at a temperature of 146° C., a tension of 185 pounds per square inch and for a period of 3 minutes. A sample of the film when heated at 120° C. for 5 minutes under no tension exhibited a shrinkage of only 0.08%, whereas another sample, which did not receive the second heat treatment, when similarly heated exhibited a shrinkage of 0.88%.

*Example IV*

A molten ethylene glycol/terephthalic acid polyester having a melting point of about 255° C. is extruded through an elongated orifice having the lips spaced about 90 mils apart onto a casting drum having a peripheral speed of about 90 inches per minute to form a film about 38 mils thick. A surface of the cast film is provided with a layer about 1.8 microns thick of a vinylidene chloride/methyl acrylate/itaconic acid copolymer (90:10:2 by weight and made as described in Example I of Alles et al. U. S. Patent 2,627,088) and dried at a temperature of about 92° C. The coated film is biaxially stretched, first laterally and then longitudinally about 3.0 times in unit width and length at a temperature of about 88° C., heat-set at a temperature of 150° C. under tension so that no shrinkage occurs and then given a second heat treatment at a temperature of 119° C. under a tension of 75 pounds per square inch for a period of 5 minutes. A sample of the resulting film when heated to a temperature of 120° C. for a period of 5 minutes under no tension exhibited a shrinkage of only 0.09%, whereas a sample of the film which did not receive the second heat treatment exhibited, under the same conditions, a shrinkage of 0.83%.

*Example V*

The process described in Example I was repeated, except that the film was heat-set at 180° C. and the second heat treatment was at a temperature of 132° C., a tension of 12 pounds per square inch and for a period of 2 minutes. A sample of the film when heated at 120° C. for 5 minutes under no tension exhibited a shrinkage of only 0.05% whereas another sample, which had not received the second heat treatment, when similarly heated, exhibited a shrinkage of 0.9%.

*Example VI*

The process set forth in Example I was repeated, except that the film was heat-set at 210° C. and the second heat treatment was at a temperature of 146° C., a tension of 185 pounds per square inch and for a period of 5 minutes. A sample of the film when heated at 120° C. for 5 minutes under no tension showed a shrinkage of only 0.10% whereas another sample which had not received the second heat treatment exhibited a shrinkage of 0.92%.

The base films of Example IV, V and VI, when provided with a thin gelatin substratum and coated with a gelatino-silver halide emulsion layer showed good anchorage and dimensional stability when developed, washed, fixed and dried.

Example VII

The process described in Example IV was repeated, substituting for the vinylidene chloride/methyl acrylate/itaconic acid copolymer of that example a solution of the polyester of Example I of Alles et al. U. S. Patent 2,698,239 in trichloroethylene. The film was heat-set at a temperature of 180° C. and the second heat treatment was at a temperature of 138° C., a tension of 40 pounds per square inch and for a period of 2½ minutes. A sample of the film, when heated to a temperature of 120° C., for a period of 5 minutes under no tension, exhibited a shrinkage of only 0.09%, whereas a sample of the film which did not receive the second heat treatment exhibited, under the same conditions, a shrinkage of 1.42%.

Example VIII

The process described in Example IV was repeated, substituting for the vinylidene chloride/methyl acrylate/itaconic acid copolymer of that example a mixture of a polyester and an organic polyisocyanate of Example I of Saner U. S. Patent 2,698,241. The film was heat-set at a temperature of 190° C., and the second heat treatment was at a temperature of 119° C., a tension of 150 pounds per square inch and for a period of 2 minutes. A sample of the film, when heated to a temperature of 120° C., for a period of 5 minutes under no tension, exhibited a shrinkage of only 0.075%, whereas a sample of the film which did not receive the second heat treatment exhibited, under the same conditions, a shrinkage of 1.18%.

Example IX

The process set forth in Example IV was repeated, substituting for the vinylidene chloride/methyl acrylate/itaconic acid copolymer of that example an organic polyisocyanate of Example V of Saner U. S. Patent 2,698,242. The film was heat-set a temperature of 180° C., and the second heat treatment was at a temperature of 132° C., a tension of 12 pounds per square inch and for a period of 2 minutes. A sample of the film, when heated to a temperature of 120° C., for a period of 5 minutes under no tension, exhibited a shrinkage of only 0.11%, whereas a sample of the film which did not receive the second heat treatment exhibited, under the same conditions, a shrinkage of 0.85%.

The casting or extrusion of the polyester into the form of a film and stretching the film can be done in any conventional apparatus for this purpose. An especially useful extrusion apparatus is described in Bicher U. S. application Ser. No. 407,678 filed February 2, 1954, and in Bicher U. S. application Ser. No. 405,710 filed January 25, 1954. An especially useful stretching apparatus is disclosed in Alles et al. U. S. application Ser. No. 303,908 filed August 12, 1952.

The polyester film, as is apparent from the above, may be composed of any polyester of a dicarboxylic acid and a dihydric alcohol of the type described in Carothers U. S. Patent 2,071,250, or may be composed of any of the high-melting difficulty soluble, usually microcrystalline, cold-drawing linear, highly polymerized esters of terephthalic acid and glycols of the series $HO(CH_2)_nOH$, where $n$ is an integer within the range of 2 to 10, described in Whinfield et al. U. S. Patent 2,465,319.

In the heat-setting and heat-relaxing steps described above, the temperatures preferably are at least 45° C. below the melting point of the particular polyester under treatment.

The uncoated biaxially oriented, heat-set, heat-relaxed polyester films obtainable in accordance with the invention have excellent dimensional stability and are useful for many purposes where a dimensionally stable unsupported film is desired. Among such uses are measuring tape (where variation in dimension of the tape after the divisions of length have been marked thereon will result in inaccurate measurements, with a residual shrinkage of 1% in the tape resulting in an error of as much as 1 foot in a 100 feet tape measure), transparent windows for envelopes (where even slight shrinkage will cause buckling of the envelope in an undesirable manner), bottle cap and other container liners (where shrinkage after the bottle or container is closed may cause leakage of the contents), laminations with other materials (where differences in shrinkage of the several layers will result in warping and uneven bending of the composite structure), package wrapping material, as for candy, cosmetics, foods, specialty items, etc. (where shrinkage of the wrapper subsequent to wrapping may cause cracking and tearing of the wrapper if originally tightly wrapped or may cause an unsightly appearance if originally loosely wrapped to allow for shrinkage), storm window substitute for glass (where shrinkage of a flat tightly attached pane or sheet may cause tearing), dials, drafting instruments, scales, reticles, etc. (where unchanging calibration is critical), etc. These and many other uses for the polyester films obtained in accordance with this invention are described in Knox U. S. P. 2,686,931.

Various radiation-sensitive materials may be coated onto the anchoring colloid layers of the light-insensitive films made in accordance with this invention. In addition to light-sensitive silver salts, such as silver chloride, silver bromide, silver chloride-bromide, silver chloride-iodide and similar mixtures, there may be utilized bichromated hydrophilic colloids, e. g., albumin, gelatin, gum arabic, polyvinyl alcohols, or glue. The light-sensitive layers, of course, are applied in the absence of actinic radiations. Immobile color formers, dye intermediates or dyes may be present in such layers. Other materials include light-sensitive iron salts and diazonium compounds with or without coupling components. With certain of these light-sensitive materials, e. g., the diazo compounds, the binding agent may have a low sensitivity to water. Thus, polyvinyl acetate or a cellulose acetate may be used as the colloid binder.

The polyesters used in accordance with the present invention need not consist solely of glycol units since some of the glycols react to form polyglycols and small percentages of units from such polyglycols can be present. For instance, when ethylene glycol is a reactant, the polyester may contain from 1 to 15% or more of units from diethylene glycol (i. e., $—CH_2CH_2OCH_2CH_2O—$ units). Also when a mixture of glycols and polyglycols is used, e. g., ethylene glycol and diethylene glycol, the copolymers may contain a substantial proportion of oxyethylene units.

The polyester film may contain a pigment or dye to color it any desired color. When the film is to be used as a photographic film base for X-ray film, it may be tinted green or blue. The copolymer layer may be similarly tinted and may contain an antistatic material. Antistatic layers and antihalation layers can be coated on the surface of the film or on the copolymer layer.

The invention is not limited to the particular layer of adherent film-forming copolymers (which are essentially hydrophobic in character) as other adherent copolymers can be used as an anchoring substratum for a water-permeable colloid layer.

The water-permeable colloid layers are not limited to those specifically listed above. Additional water-permeable colloids having a protective colloid action which can be used include water-soluble polyvinyl alcohol derivatives in general, e. g., partially hydrolyzed polyvinyl acetates, and mixed polyvinyl-chloride-acetates, hydrolyzed interpolymers of vinyl acetate with unsaturated compounds, for example, maleic anhydride, acrylic acid esters, etc. Suitable colloids of the last mentioned types are disclosed in United States Patents 2,276,322, 2,276,323 and 2,397,866. Still other colloids include hydrophilic partially substituted polyvinyl esters and acetals and the low substituted cellulose esters of saturated aliphatic monocarboxylic acids of 2 to 4 carbon atoms and low substituted cellulose ethers, e. g., methyl-cellulose, ethyl-cellulose, etc. Additional natural colloids include casein, albumin, gum arabic, agar agar, polyglycuronic acid, etc. which are also anchored to supports by these new substrata.

The copolymer-coated biaxially oriented polyester base films made in accordance with this invention can be used for any purpose including radiography, portrait photography, color photography, lithography and motion picture purposes. They are also useful for projection screens, glazing (laminations for windows and surface protection).

An advantage of the invention is that a dimensionally stable unsupported polyester film can be prepared in a simple manner. Another advantage is that the processes of the invention are dependable and can be easily controlled. A further advantage is that the processes do not require complicated or expensive equipment and can be carried out on a semicontinuous scale. A still further advantage is that the invention provides dimensionally-stable copolymer coated polyester films. An important advantage of the invention is that it provides photographic films bearing at least one light-sensitive layer on a polyester base that is dimensionally stable under conditions of processing and use even at temperatures above stretching temperatures.

This application is a continuation-in-part of my co-pending application Ser. No. 435,363, filed June 8, 1954, now abandoned.

The embodiments of the invention in which an exclusive property or privilege is claimed are defined as follows:

1. In a process of making a dimensionally-stable polyester film which comprises forming a sheet of film from a molten highly polymeric ester substantially composed of the polyesterification product of a dicarboxylic acid and a dihydric alcohol, said ester being capable of being formed into filaments which when cold-drawn show by characteristic X-ray patterns molecular orientation along the fiber axis, biaxially orienting the film by stretching it at an elevated temperature, heat-setting the film at a temperature between 150° C. and 210° C. under conditions such that no shrinkage occurs; the step which comprises modifying the heat-set film by heating it to a temperature of 110° C. to 150° C. for a period of 60 to 300 seconds while maintaining said film under a tension of about 10 to 300 pounds per square inch.

2. In a process as set forth in claim 1 wherein a surface of the cast polyester film is coated with a layer of an adherent film-forming copolymer prior to biaxially orienting it.

3. A process as set for in claim 2 wherein a water-permeable colloid layer is applied after the final heating step.

4. A process as set forth in claim 2 wherein a water-permeable colloid layer is applied prior to the final heating step.

5. A process as set forth in claim 4 wherein a water-permeable colloid silver halide emulsion layer is coated on the water-permeable colloid layer.

6. A process as set forth in claim 5 wherein said colloid is gelatin.

7. In a process of making a dimensionally-stable, coated polyester film which comprises forming a sheet of film from a molten highly polymeric ester substantially composed of the polyesterification product of a dicarboxylic acid and a dihydric alcohol, said ester being capable of being formed into filaments which when cold-drawn show by characteristic X-ray patterns molecular orientation along the fiber axis, coating at least one surface of the film with an aqueous dispersion of a vinylidene chloride copolymer containing at least 35% by weight of vinylidene chloride, drying the coated polymeric ester film, biaxially orienting the coated film by stretching it at an elevated temperature, heat-setting the polymer-coated film at a temperature between 150° C. and 210° C. under conditions such that no shrinkage occurs; the step which comprises modifying the heat-set film by heating it to a temperature of 110° C. to 150° C. for a period of 60 to 300 seconds while maintaining said film under a tension of about 10 to 300 pounds per square inch.

8. In a process of making a dimensionally-stable, coated polymer film which comprises forming a sheet of film from a molten highly polymeric ester substantially composed of the polyesterification product of dicarboxylic acid and a dihydric alcohol, said ester having a melting point from 150° C. to 300° C. and being capable of being formed into filaments which when cold-drawn show by characteristic X-ray patterns molecular orientation along the fiber axis, coating at least one surface of the film with an aqueous dispersion of a vinylidene chloride copolymer containing at least 35% by weight of vinylidene chloride, drying the coated polymeric ester film, biaxially orienting the coated film by stretching it at an elevated temperature, heat-setting the copolymer-coated film at a temperature between 150° C. and 210° C. under conditions such that no shrinkage occurs, coating the layer of copolymer with an aqueous solution containing a water-permeable colloid and drying the resulting layer; the step which comprises modifying the heat-set film after the stretching operation by heating it to a temperature of 110° C. to 150° C. for a period of 60 to 300 seconds while maintaining said film under a tension of about 10 to 295 pounds per square inch.

9. A process as set forth in claim 8 wherein said colloid is gelatin.

10. In a process of making a dimensionally-stable, coated polyester film which comprises forming a sheet of film from a molten highly polymeric ester of at least one polymethylene glycol containing 2 to 10 methylene groups and terephthalic acid, said ester having a melting point from 200° C. to 300° C., coating at least one surface of the film with an aqueous dispersion of a highly hydrophobic vinylidene chloride copolymer containing 35 to 96% by weight of vinylidene chloride, drying the coated polymeric ester film, biaxially orienting the coated film by laterally and longitudinally stretching it at an elevated temperature, heat-setting the polymer-coated film at a temperature between 150° C. and 210° C. under conditions so that no shrinkage occurs, coating the layer of copolymer with an aqueous solution containing a water-permeable colloid and drying the resulting layer; the step which comprises modifying the heat-set film after the stretching operation by heating it to a temperature of 110° C. to 150° C. for a period of 60 to 300 seconds while maintaining said film under a tension of about 10 to 295 pounds per square inch.

11. A process as set forth in claim 10 wherein said second heating operation is carried out under a tension of 10 to 25 pounds per square inch.

12. In a process of making a dimensionally-stable, coated polyester film which comprises forming a sheet of film from a molten highly polymeric ester of a polymethylene glycol containing 2 to 10 methylene groups and terephthalic acid, said ester having a melting point from 200° C. to 300° C., coating at least one surface of the film with an aqueous dispersion of a highly hydrophobic vinylidene chloride copolymer containing 35 to 96% of vinylidene chloride, 3.5 to 64.5% acrylic ester and 0.5 to 25% itaconic acid, all by weight, drying the coated polymeric ester film, biaxially orienting the coated film by laterally and longitudinally stretching it at an elevated temperature, heat-setting the polymer-coated film at a temperature between 150° C. and 210° C. under conditions such that no shrinkage occurs, coating the layer of copolymer with an aqueous solution containing a water-permeable colloid and drying the resulting layer; the step which comprises modifying the heat-set film after the stretching operation by heating it to a temperature of 110° C. to 150° C. for a period of 60 to 300 seconds while maintaining said film under a tension of 10 to 295 pounds per square inch.

13. A process as set forth in claim 12 wherein said polymeric ester is a polyethylene terephthalate.

14. A shaped article comprising a sheet of a biaxially oriented polymeric ester of a dicarboxylic acid and a dihydric alcohol, said ester being capable of being formed into filaments which when cold-drawn show by characteristic X-ray patterns molecular orientation along the fiber axis, said article exhibiting a shrinkage of not more than 0.2% when heated to a temperature of 120° C. for a period of 5 minutes.

15. A coated article comprising a sheet of a biaxially oriented polymeric ester of a dicarboxylic acid and a dihydric alcohol, said ester being capable of being formed into filaments which when cold-drawn show by characteristic X-ray patterns molecular orientation along the fiber axis, having on at least one surface a thin layer of an adherent film-forming essentially hydrophobic copolymer, said article exhibiting a shrinkage of not more than 0.2% when heated to a temperature of 120° C. for a period of 5 minutes.

16. A coated article comprising a sheet of a biaxially oriented polymeric ester of a dicarboxylic acid and a dihydric alcohol, said ester being capable of being formed into filaments which when cold-drawn show by characteristic X-ray patterns molecular orientation along the fiber axis, having on at least one surface a thin layer of a vinylidene chloride copolymer containing at least 35% by weight of vinylidene chloride, said article exhibiting a shrinkage of not more than 0.2% when heated to a temperature of 120° C. for a period of 5 minutes.

17. A coated article comprising a sheet of a polymeric ester of a dicarboxylic acid and a dihydric alcohol, said ester being capable of being formed into filaments which when cold-drawn show by characteristic X-ray patterns molecular orientation along the fiber axis, having on at least one surface a thin layer of an adherent film-forming essentially hydrophobic copolymer, said layer of copolymer having superposed thereon a layer of a water-permeable colloid, said article exhibiting a shrinkage of not more than 0.2% when heated to a temperature of 120° C. for a period of 5 minutes.

18. An article as set forth in claim 17 wherein said polymeric ester is polyethylene terephthalate.

19. A coated article comprising a sheet of a biaxially oriented polymeric ester of a dicarboxylic acid and a dihydric alcohol, said ester being capable of being formed into filaments which when cold-drawn show by characteristic X-ray patterns molecular orientation along the fiber axis, having on at least one surface a thin layer of an adherent film-forming essentially hydrophobic copolymer, said layer of copolymer having superposed thereon a layer of a water-permeable colloid which in turn has superposed thereon a water-permeable colloid silver halide emulsion layer, said article exhibiting a shrinkage of not more than 0.2% when heated to a temperature of 120° C. for a period of 5 minutes.

20. An article as set forth in claim 19 wherein said copolymer is a vinylidene chloride/acrylic ester/itaconic acid copolymer containing such components in respective amounts, by weight, of 35 to 96%, 3.5 to 64.5% and 0.5 to 25.0% and said colloid is gelatin.

References Cited in the file of this patent

UNITED STATES PATENTS 2,627,088    Alles _____ Feb. 3, 1953